United States Patent [19]

Rohrmann

[11] 4,107,280
[45] Aug. 15, 1978

[54] OXIDATION OF HYDROGEN HALIDES TO ELEMENTAL HALOGENS WITH CATALYTIC MOLTEN SALT MIXTURES

[75] Inventor: Charles A. Rohrmann, Kennewick, Wash.

[73] Assignee: Battelle Memorial Institute, Richland, Wash.

[21] Appl. No.: 820,733

[22] Filed: Aug. 1, 1977

[51] Int. Cl.² .............................................. C01B 7/00
[52] U.S. Cl. .................................. 423/502; 423/507; 423/DIG. 12
[58] Field of Search ............... 423/507, 502, DIG. 12, 423/659 R

[56] References Cited

U.S. PATENT DOCUMENTS

| 292,742 | 7/1943 | Beck et al. .................. 423/659 R |
| 393,258 | 7/1943 | Beck et al. .................. 423/659 R |
| 2,206,399 | 7/1940 | Grosvenor, Jr. et al. ........... 423/507 |
| 2,312,952 | 3/1943 | Balcar ................................. 423/502 |
| 2,330,114 | 9/1943 | De Jahn ............................. 423/502 |
| 2,418,931 | 4/1947 | Gorin ................................. 423/502 |
| 2,451,870 | 10/1948 | Richardson et al. ............... 423/502 |
| 2,542,961 | 2/1951 | Johnson et al. .................... 423/502 |
| 2,878,105 | 3/1959 | Walter ................................ 423/507 |
| 3,201,201 | 8/1965 | Van Dijk et al. .................... 423/502 |
| 4,041,142 | 8/1977 | Moore .......................... 423/DIG. 12 |

FOREIGN PATENT DOCUMENTS 1,240,830 5/1967 Fed. Rep. of Germany ........... 423/502

Primary Examiner—Brian Hearn
Attorney, Agent, or Firm—Klarquist, Sparkman, Campbell, Leigh, Hall & Whinston

[57] ABSTRACT

A process for oxidizing hydrogen halides by means of a catalytically active molten salt is disclosed. The subject hydrogen halide is contacted with a molten salt containing an oxygen compound of vanadium and alkali metal sulfates and pyrosulfates to produce an effluent gas stream rich in the elemental halogen. The reduced vanadium which remains after this contacting is regenerated to the active higher valence state by contacting the spent molten salt with a stream of oxygen-bearing gas.

16 Claims, 2 Drawing Figures

OXIDATION OF HYDROGEN HALIDES TO ELEMENTAL HALOGENS WITH CATALYTIC MOLTEN SALT MIXTURES

BACKGROUND OF THE INVENTION

The present invention relates to the regeneration of elemental halogens from hydrogen halides and/or hydrohalic acids and more specifically to the use of a molten salt to catalytically oxidize hydrogen chloride to produce chlorine in the absence of an oxygen-bearing gas.

In the production of organic chlorides for use in plastics and other products, large amounts of hydrochloric acid are frequently produced as a by-product or waste. This excess hydrochloric acid is traditionally either utilized productively, if possible, or neutralized with limestone and discharged to the environment as an aqueous waste. Due to the increasing restrictions on the discharge of pollutants and the rising cost of chlorine, it has become more attractive to provide a method for regenerating chlorine from the by-product hydrochloric acid. Previous methods for regenerating chlorine from hydrochloric acid have, however, met with engineering and economic problems which prevented their implementation on a large scale.

It is presently known that hydrogen chloride, for example, may be oxidized with sulfur trioxide to produce a mixture of chlorine and sulfur dioxide. This process requires a series of at least three separate process steps to obtain the mixture from which the chlorine must be subsequently separated.

Another prior method is the oxidation of hydrochloric acid with sulfur dioxide and oxygen in the presence of a bed of metal oxide catalysts to produce sulfuric acid and chlorine. The solid supported catalysts used in such systems are difficult to prepare and tend to deactivate or degrade rapidly.

Oxygen is also being used to oxidize hydrogen chloride in the presence of an oxide of nitrogen catalyst and an excess of sulfuric acid having a concentration of at least 65 percent. This process is complicated and expensive because it requires numerous process steps.

Hydrochloric acid has also been oxidized with oxygen in molten inorganic chlorides and an olefin chlorine acceptor such as ethylene. Such systems must accomodate complex chemical reactions which produce a variety of different reaction products. Also, because inorganic chlorides tend to volatilize in the reaction zone, the catalyst is driven off and separation of chlorine from the reactor effluent is difficult. Furthermore, operation with chloride salts is corrosive to process equipment.

In addition, hydrochloric acid has been regenerated by means of electrolytic processes which are expensive and which require substantial electrical energy consumption.

SUMMARY OF THE INVENTION

The present invention is a simple method of regenerating halogens from hydrogen halides. The method can be conducted in relatively simple apparatus, can economically be used to process large volumes of hydrogen halides and is especially well suited for the regeneration of chlorine.

Hydrogen halide gas produced from a waste or by-product hydrohalic acid is contacted with catalytically active molten salt in a suitable salt contactor. The salt is comprised chiefly of alkali metal pyrosulfates and sulfates with a lesser amount of vanadium pentoxide which serves as a source of oxygen for reaction with the hydrogen halide. The gaseous effluent stream which leaves the contacter contains the halogen, steam and any unreacted hydrogen halide, but no free oxygen. The halogen is separated from the mixture of effluent gases, and the spend salt solution contacted with the stream of oxygen-bearing gas to regenerate the dissolved vanadium to its active higher valence state.

It is an object of the present invention to provide a method for economically regenerating elemental halogens from waste or by-product hydrohalic acids and thereby to avoid polluting the environment and to provide an inexpensive source of halogens for industrial use.

An additional object of the invention is to realize a significant degree of energy conservation by providing a nonelectrical method of halogen production.

A further object of this invention is to provide the process requiring a minimum of pretreatment such as extensive water removal from the feed streams.

It is still a further object of the invention to provide a method for regenerating halogens from hydrohalic acids which requires a minimum of equipment and supervision.

Still another object of this invention is to provide a method of oxidizing hydrogen halides in the absence of an oxygen-bearing gas and in the presence of liquid alkali metal sulfates containing an oxygen compound of vanadium.

These and other objects and advantages of the invention will become apparent upon reading the following specification.

DESCRIPTION OF THE PREFERRED EMBODIMENT

Figure 1:
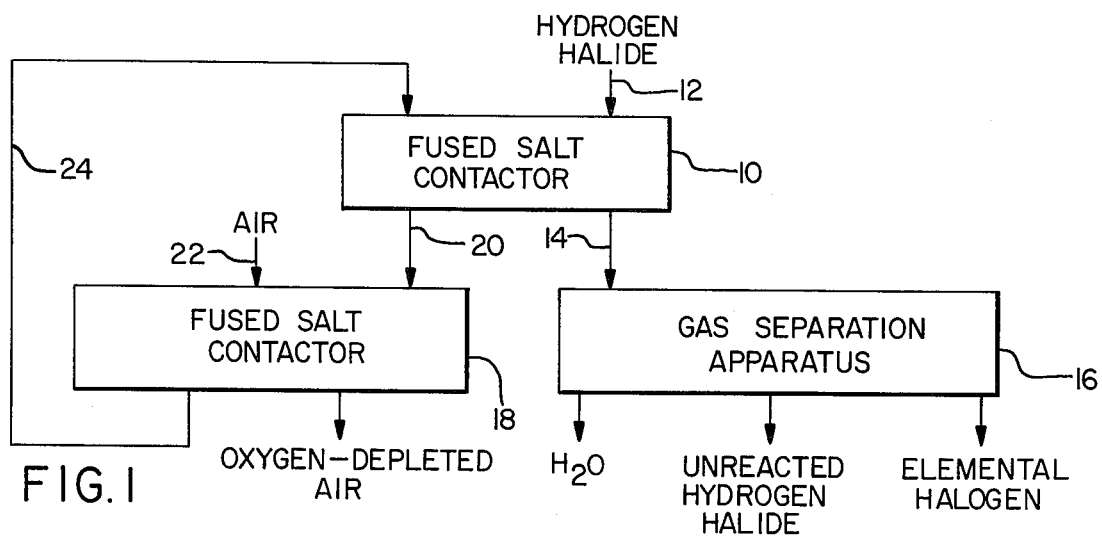
FIG. 1 is a schematic flow diagram showing the general process of the present invention.

Referring to FIG. 1, the general process of the present invention for regenerating either chlorine, bromine or iodine from their respective halides is shown. A waste or by-product hydrogen halide gas is fed to a fused salt contactor 10 via a line 12. The contactor 10 contains a molten salt mixture including a dissolved oxygen compound of vanadium. When contacted with this mixture, the hydrogen halide is oxidized by reaction with the vanadium compound according to the following general reaction:

$$2HX + V_2O_5 \rightarrow V_2O_4 + X_2 + H_2O \qquad (1)$$

X = Cl, Br or I

Kinetics do not allow the reaction according to equation (1) to proceed to completion. For this reason the effluent gas mixture leaving the salt contacter 10 in a line 14 contains a mixture of steam, unreacted hydrogen halide gas, and elemental halogen gas. It is an advantage of this process that little or no free oxygen gas is formed in the contactor 10 and therefore that components of the effluent gas mixture can easily be separated by conventional gas separation apparatus 16.

Contact with the hydrogen halide gas causes the vanadium in the molten salt mixture to be reduced to a lower valence state. The vanadium must be regenerated therefrom before the salt mixture can be reused. This regeneration is accomplished by transporting the spent salt mixture to a second fused salt contacter 18 via a line 20. The salt mixture is there contacted with a stream of oxygen-bearing gas such as air, introduced through a line 20. The vanadium reacts with oxygen in the gas and this is regenerated to its higher valence state. The regenerated salt is returned to the first fused salt contacter 10, in a line 24, and the oxygen-bearing gas either recirculates, if economically advantageous, or vented to the atmosphere.

Figure 2:
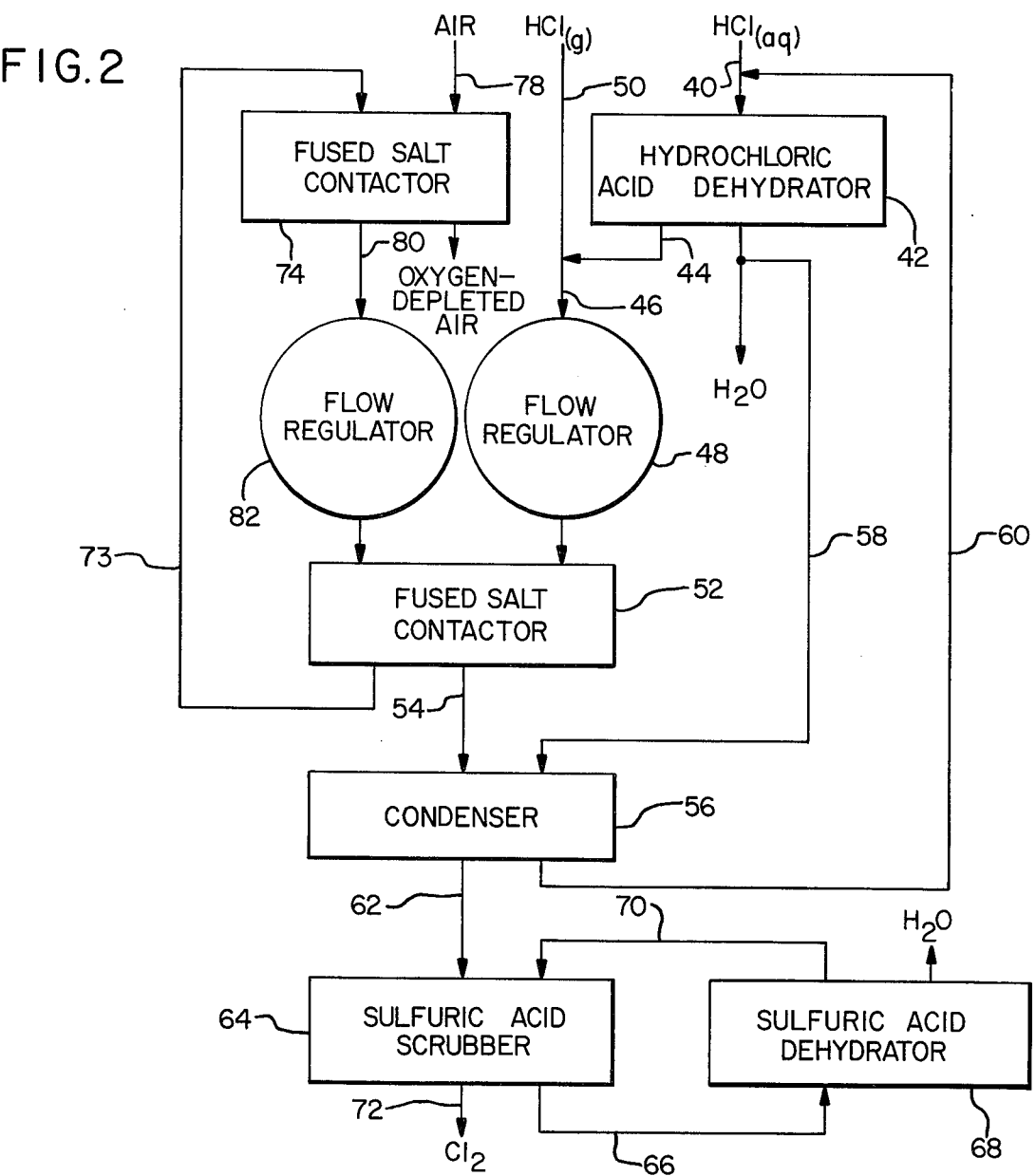
FIG. 2 is a schematic flow diagram showing the process of the present invention including specific steps for the isolation of chlorine gas.

A more specific embodiment of the invention appears in FIG. 2 which shows the process adapted for the regeneration of chlorine gas from hydrogen chloride. Waste or by-product hydrochloric acid in a line 40 is passed into a hydrochloric acid dehydrator 42. Hydrogen chloride gas produced in the dehydrator 42, which still may contain appreciable water vapor, is directed via a line 44 into a line 46 including a flow regulator 48. If waste or by-product hydrogen chloride is substantially free of water, it can be fed directly into the line 46 via a line 50 without passing through the dehydrator 42. Hydrogen chloride in the line 46 passes into a fused salt contactor 52, wherein the hydrogen chloride gas is contacted with a molten salt mixture including $V_2O_5$ which oxidizes the hydrogen chloride according to the general reaction:

$$2HCl + V_2O_5 \rightarrow V_2O_4 + Cl_2 + H_2O \qquad (2)$$

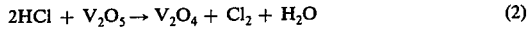

The gaseous effluent gas leaving the contactor 52 via a line 54 contains substantial amounts of water vapor and chlorine along with some residual hydrogen chloride, but substantially no free oxygen.

The hydrogen chloride and a majority of the water vapor in the effluent gas stream may be removed by means of a condenser 56. In the condenser, the effluent gas stream is cooled until the water vapor condenses and dissolves the hydrogen chloride to form hydrochloric acid. If the amount of water obtained from the effluent gas is insufficient to dissolve all the hydrogen chloride, some make up water should be added to the condensed water vapor. Such make up water may be obtained from the dehydrator 42 via a line 58. If the dehydrator 42 is less than perfectly efficient, the effluent it produces will actually be a weak hydrochloric acid. By using the dehydrator 42 as a source of make up water for the condenser 56, at least a portion of the dilute acid is recycled. The concentrated hydrochloric acid produced in the condenser 56 may be recycled by returning it via a line 60 to the line 40 upstream of the dehydrator 42.

The mixture leaving the condenser 56 through a line 62 consists of chlorine and a small residual amount of water vapor. These gases are scrubbed in a sulfuric acid scrubber 64 where the residual water vapor is absorbed by the stream of sulfuric acid. As the sulfuric acid passes through the scrubber 64 it becomes diluted with water. The diluted acid may be continuously regenerated by passing it via a line 66 to a suitable sulfuric acid dehydrator 68 which includes heating means for vaporizing the water to concentrate the sulfuric acid. The reconcentrated acid is subsequently returned to the acid scrubber 64 via a line 70. The gas which leaves the sulfuric acid scrubber 64 via a line 72 is substantially pure chlorine gas which is suitable for a variety of industrial uses.

Because the valence state of the vanadium in the salt mixture is reduced when the hydrogen chloride is oxidized in the fused salt contactor 52 according to reaction (2), it is necessary to regenerate the vanadium to its higher valence state. Such regeneration is accomplished by transporting the molten salt which contains reduced vanadium through a line 73 into a second fused salt contactor 74 where it is contacted with an oxygen-bearing gas introduced from a line 78. The vanadium is thereby oxidized to regenerate the $V_2O_5$ according to the following general equation reaction:

$$V_2O_4 + \tfrac{1}{2}O_2 \rightarrow V_2O_5 \qquad (3)$$

The regenerated molten salt, which now includes vanadium in its high valence state, leaves the contactor 74 in a line 80 and is returned for reuse to the salt contactor 52 by way of a flow regulator 82.

Air is the preferred oxygen-bearing regeneration gas due to its ready availability and low cost. The air is circulated through the salt contactor 74 and then vented directly to the atmosphere. Oxygen is another suitable gas. It is used most efficiently if the unreacted fraction of the oxygen leaving the contactor 74 is returned to the line 78.

The ratio at which hydrogen chloride and molten salt are combined in the salt contactor 52 has an effect on the overall efficiency of the system. The preferred ratio will depend on the salt composition and operating temperature, but may be easily determined by experimentation.

It is important that the water content of the gas in line 46 be low because excess water in the salt contactor 52 will drive the reaction of equation (2) to the left and thus impede the formation of chlorine. Small amounts of water do not substantially affect the formation of chlorine, but if sufficiently large quantities of water are present, chlorine formation can be severely reduced. To obtain the most economical operation, the expense of feedstock dehydration can be weighed against the amount and value of chlorine regenerated to determine the preferred water content for the feedstock stream.

A salt composition suitable for use according to the present invention includes alkali metal sulfates, alkali metal pyrosulfates and a dissolved oxygen compound which is capable of reacting with the hydrogen chloride to produce elemental chlorine. $V_2O_5$ is an exceptionally active oxygen compound which may be included in the salt mixture to the extent that it will dissolve in the melt. Preferably, $V_2O_5$ comprises between 2 and 25 wt. percent of the salt mixture and more preferably between 10-15 wt. percent.

Other soluble metal oxides may be used for the oxidation of hydrogen chloride according to the process of the present invention. These include soluble oxides of copper, iron, chromium or manganese. Less suitable are oxides of lead, nickel, cobalt or uranium.

A variety of different alkali metal sulfates and pyrosulfates may be chosen to make up the bulk of the mixture. Sulfates and pyrosulfates of potassium and sodium are preferred due to their abundance and favorable characteristics. A mixture containing 5 to 25 wt. percent of potassium sulfate and 50 to 90 wt. percent potassium pyrosulfate is satisfactory. The preferred range of these sulfates is 10 to 20 wt. percent potassium sulfate and 65 to 70 wt. percent potassium pyrosulfate. Small amounts of any other soluble sulfate or pyrosulfate can be added to such a mixture of potassium compounds without greatly reducing the effectiveness of the salt mixture. In addition, the inclusion of small amounts of lithium sulfate, sodium sulfate or sulfuric acid have been found to have desirable effect on the freezing temperature, corrosivity, $SO_3$ vapor pressure, viscosity, and operating temperature range of the salt mixture. The combined amounts of these substances in the salt mixture should not substantially exceed 10 wt. percent. Additions beyond this amount are found to be either undesirable or unfeasible.

When this preferred salt mixture is used, hydrogen chloride may be oxidized when the salt is maintained in the temperature range of 275° C. to 475° C. The best results are achieved in the temperature range of 325° C. to 425° C. If the gaseous hydrogen chloride is contacted with the salt mixture in this temperature range, for at least 0.25 second, and preferably for between 0.5 and 5.0 seconds, a substantial amount of hydrogen chloride will be oxidized to chlorine according to the action of equation (2).

Operating temperatures and retention times used in the second contactor 74 may conveniently be similar to those of the first contactor 74. In the contactor 74, however, the ratio of gas to salt is not critical so long as excess oxygen is present to drive the reaction of equation (3) as far to the right as possible.

Assuming conservatively, that 60% conversion of hydrogen chloride is achieved when substantially dry hydrogen chloride gas is the feedstock, the effluent gas leaving the salt contactor 52 would contain in volume about:

| | |
|---|---|
| 30% | $Cl_2$ |
| 30% | $H_2O$ |
| 40% | HCl |

EXAMPLE

A series of experiments was conducted to determine whether efficient conversion of hydrogen chloride to chlorine could be accomplished according to the process of the present invention. In these experiments Vycor vessels positioned inside tube furnaces were used to contain the molten salt mixture which included $K_2S_2O_7$, $K_2SO_4$ and $V_2O_5$. A metered stream of hydrogen chloride was dispersed into the molten catalyst mixture by means of a Pyrex frit, and effluent gas leaving the vessel was scrubbed with a KI solution to remove the chlorine formed and any residual HCl present. Each run was one hour long. During the runs, the vanadium was successfully regenerated whenever the apparent HCl conversion diminished by about 50%. Regeneration was accomplished by stopping the flow of hydrogen chloride and then dispersing air into the salt mixture via the frit.

At the conclusion of each run, the total chlorine formed was determined by titrating the free iodine in the scrubber solution with sodium thiosulfate. The amount of unreacted hydrogen chloride was determined by titrating the scrubber solution with sodium hydroxide. The results of the various runs are presented in Table I. As these results show, substantial yields were obtained when sufficient $V_2O_5$ was present, even though conditions were not optimized and the experimental apparatus was quite simple.

TABLE I

| | | Conversion of HCl to Chlorine | | | |
|---|---|---|---|---|---|
| Run No. | Reaction Temp (° C) | Cl Injected as HCl (g.) | Cl recovered as $Cl_2$ (g.) | Composition of salt$_a$ | Conversion (%)$_b$ |
| 1 | 375 | 20.00 | 10.424 | A | 52.12 |
| 2 | 375 | 6.16 | 4.078 | A | 66.20 |
| 3 | 400 | 14.752$_c$ | 2.386 | B | 16.17 |
| 4 | 400 | 35.824$_c$ | 6.281 | B | 17.53 |

| a. Salt compositions: | | | |
|---|---|---|---|
| A = | 80% | $K_2S_2O_7$ | (400.0g), |
| | 10% | $K_2SO_4$ | (50.0g), |
| | 10% | $V_2O_5$ | (50.0g). |
| B = | 85% | $K_2S_2O_7$ | (314.5g), |
| | 5% | $K_2SO_4$ | (18.5g), |
| | 10% | $V_2O_5$ | (37.0g). | b. Conversion is calculated for the total run. Significant variations between individual samples were observed throughout the runs. Regeneration with air was initiated when the apparent HCl conversion diminished by about 50%.

c. HCl feed gas was diluted with nitrogen.

The most economically significant use for the process of the present invention is in the regeneration of chlorine from hydrogen chloride. For this reason most of the foregoing discussion relates specifically to chlorine. It is to be understood, however, that the fused salt contactors and salt mixtures of the present invention may be applied to regenerate free halogens with a high degree of conversion from any of the hydrogen halides with the exception of HF.

While I have shown and described a preferred embodiment of my invention, it will be apparent to those skilled in the art that changes and modifications may be made without departing from my invention in its broader aspects. For example, sodium sulfate and sodium pyrosulfate can be substituted for all or part of the potassium sulfate and potassium pyrosulfate in the above described salt mixture. The resulting mixture will perform suitably, but will be somewhat less thermally stable and less active in the oxidation of hydrogen chloride than the preferred mixture of potassium salts. Also, the partial pressure of $SO_3$ tends to be higher at a given temperature when sodium sulfate is used.

I claim:

1. A process for regenerating an elemental halogen, selected from chlorine, bromine and iodine, from a corresponding hydrogen halide comprising:
   contacting a hydrogen halide in the substantial absence of an oxygen-bearing gas, with a molten salt mixture which includes a dissolved oxygen compound capable of reacting with said hydrogen halide to produce an elemental halogen and water; and
   maintaining said salt mixture during said contacting at an elevated temperature sufficient to sustain a reaction between said oxygen compound and said hydrogen halide to produce a gaseous effluent, substantially free of gaseous oxygen and containing primarily steam and said elemental halogen along with a smaller amount of unreacted hydrogen halide.

2. A process according to claim 1 wherein:
said halogen comprises chlorine;
said hydrogen halide comprises hydrogen chloride;
said salt mixture contains 5 to 25 wt. percent $K_2SO_4$ and 50 to 90 wt. percent $K_2S_2O_7$; and
said temperature is maintained between 275° C. and 475° C.

3. A process according to claim 2 wherein said hydrogen chloride is maintained in contact with said salt mixture for at least 0.25 seconds.

4. A process according to claim 2 wherein said dissolved oxygen compound comprises an oxide of vanadium.

5. A process according to claim 2 wherein said temperature is maintained between 325° C. and 425° C.

6. A process according to claim 3 wherein said hydrogen chloride is maintained in contact with said salt mixture for a time period in the range of 0.5 to 5.0 seconds.

7. A process according to claim 4 wherein:
said oxide comprises $V_2O_5$; and
said salt mixture comprises 2 to 25 wt. thereof.

8. A process according to claim 7 wherein said salt mixture contains 10 to 15 wt. percent $V_2O_5$.

9. A process according to claim 1 wherein said salt mixture also includes alkali metal sulfates and alkali metal pyrosulfates.

10. A process according to claim 9 wherein said salt mixture contains 5 to 25 wt. percent $Na_2SO_4$ and 50 to 90 wt. percent $Na_2S_2O_7$.

11. A process according to claim 10 wherein:
said oxygen compound comprises $V_2O_5$; and
said salt mixture contains 2 to 25 wt. percent oxygen compound.

12. A process according to claim 1 wherein said oxygen compound is selected from those compounds which, after reaction with said hydrogen halide, leave a reaction product which is soluble in said salt mixture and which, when dissolved in said salt mixture, will react with oxygen in an oxygen-bearing gas contacted therewith to regenerate said oxygen compound.

13. A process for regenerating elemental chlorine from hydrogen chloride comprising:
in the substantial absence of an oxygen-bearing gas, contacting hydrogen chloride with a molten salt mixture comprising 5 to 25 wt. percent $K_2SO_4$, 50 to 90 wt. percent $K_2S_2O_7$ and 2 to 25 wt. percent $V_2O_5$;
during said contacting, maintaining said salt mixture at an elevated temperature sufficient to sustain a reaction between vanadium in its higher valence state ($V^{+5}$) and said hydrogen chloride whereby at least a portion of said vanadium, which is dissolved in said salt mixture, is reduced to a lower valence state and whereby a gaseous effluent, substantially free of gaseous oxygen and containing primarily steam and chlorine gas along with unreacted hydrogen chloride, is produced;
separating said effluent from the resulting salt mixture containing said reduced vanadium; and
contacting said salt mixture containing said reduced vanadium with an oxygen-bearing gas at an elevated temperature sufficient to sustain a reaction between oxygen in said oxygen-bearing gas and said dissolved, reduced vanadium to thus regenerate said vanadium to its higher valence state so that said salt mixture may be used for contacting additional amounts of said hydrogen chloride.

14. A process according to claim 13 wherein said oxygen-bearing gas comprises air.

15. A process for regenerating elemental chlorine from hydrogen chloride comprising:
in the substantial absence of an oxygen-bearing gas, contacting hydrogen chloride with a molten salt mixture at a temperature between 275° C. and 475° C. for at least 0.25 seconds to produce a gaseous effluent including steam and chlorine gas;
said salt mixture comprising, in weight percent, 5–25% $K_2SO_4$; 50–90% $K_2S_2O_7$; 2–25% $V_2O_5$; and up to 10% sulfate selected from the group consisting of $Li_2SO_4$; $Na_2SO_4$; $H_2SO_4$ and mixtures thereof.

16. A process according to claim 15 wherein:
said temperature is between 325° C. and 425° C.;
said contacting is for 0.5 to 5.0 seconds; and
said salt mixture includes, in weight percent, 10–20% $K_2SO_4$; 50–90% $K_2S_2O_7$; and 10–15% $V_2O_5$.

* * * * *